Figure 1:
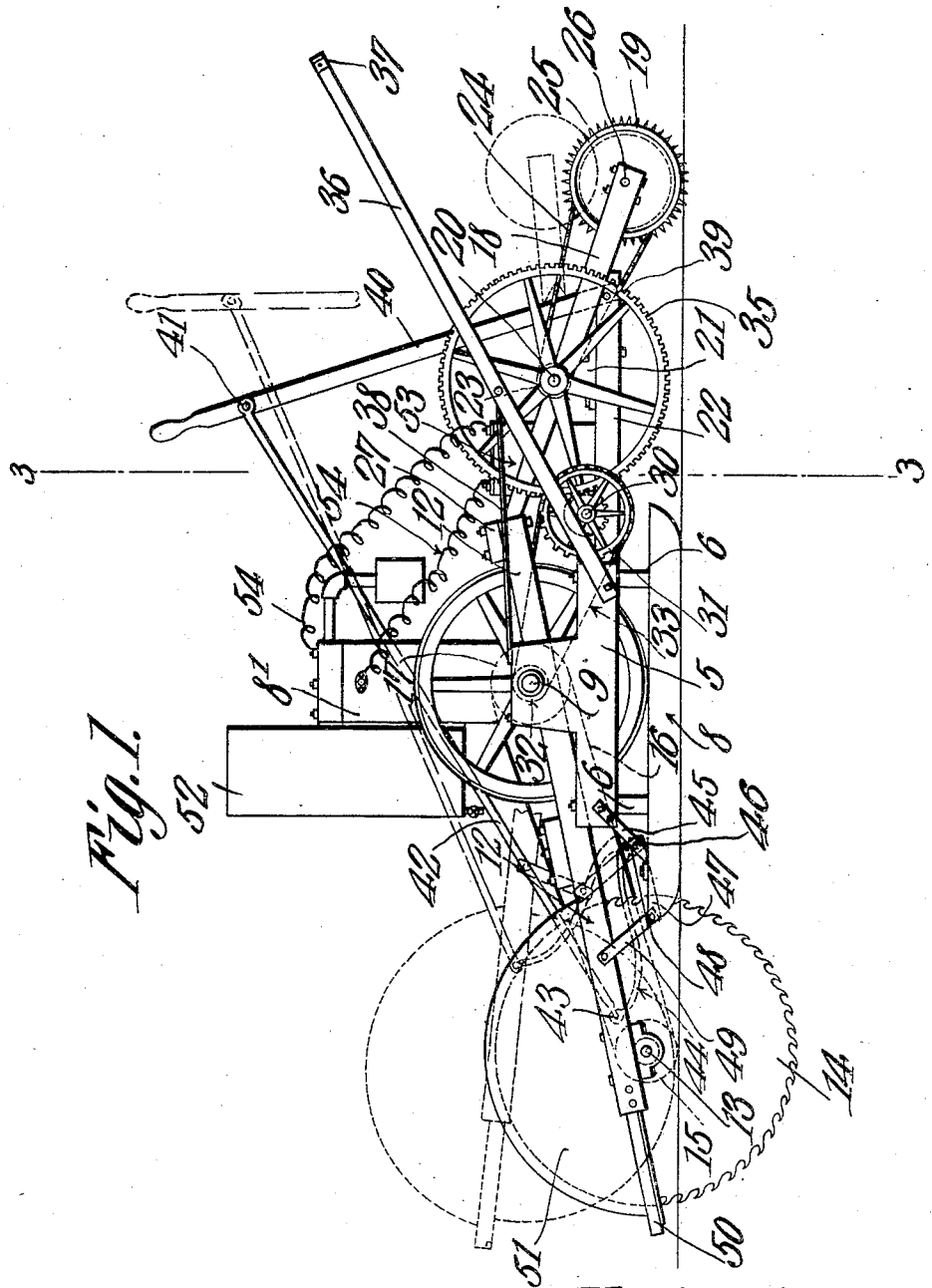

J. H. FISCH & J. C. BABST.
ICE SAWING MACHINE.
APPLICATION FILED MAR. 23, 1908.

929,846.

Patented Aug. 3, 1909.
2 SHEETS—SHEET 1.

James H. Fisch and
Joseph C. Babst
Inventors

By C. A. Snow & Co.
Attorneys

J. H. FISCH & J. C. BABST.
ICE SAWING MACHINE.
APPLICATION FILED MAR. 23, 1908.
929,846.
Patented Aug. 3, 1909.
2 SHEETS—SHEET 2.
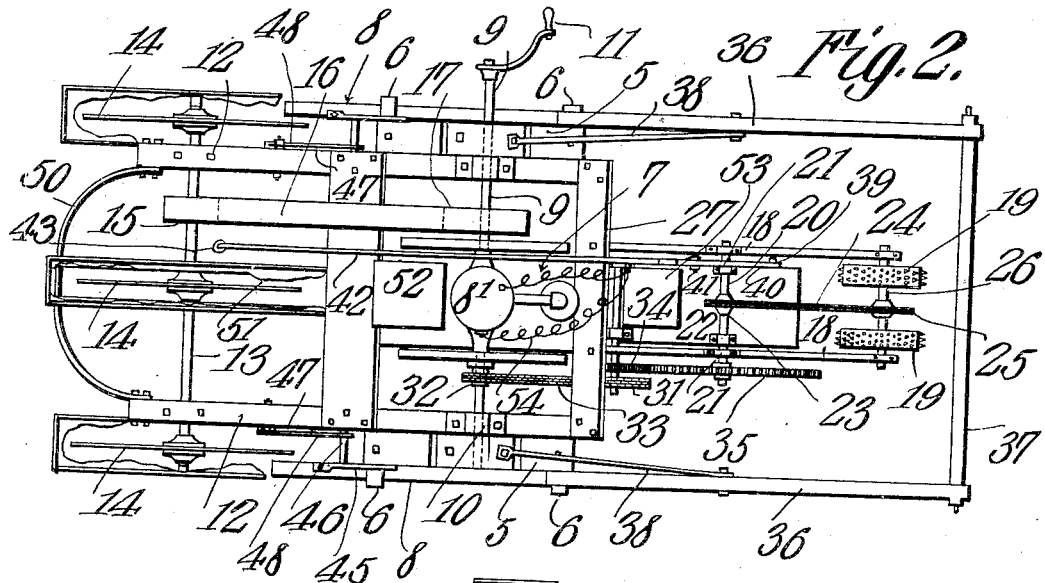
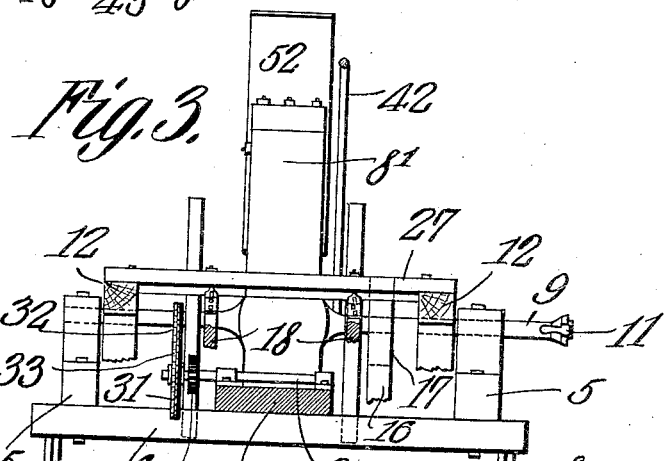
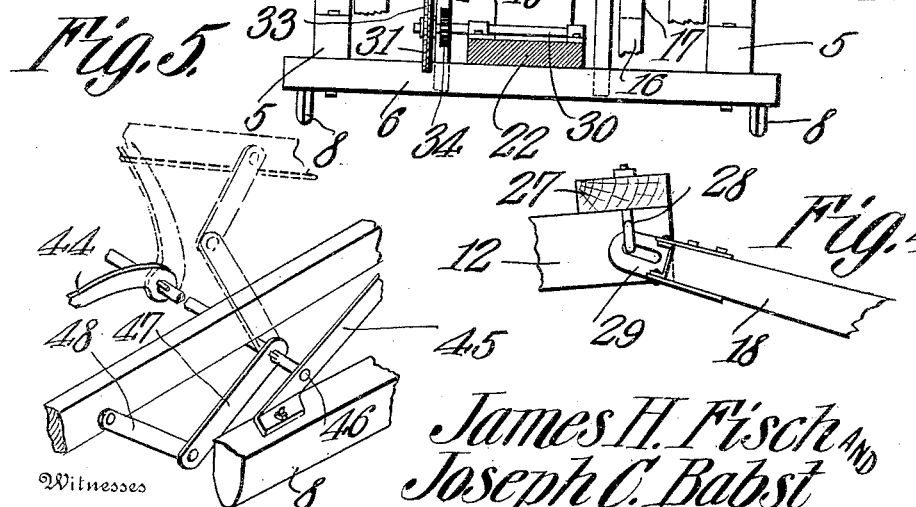
James H. Fisch and
Joseph C. Babst
Inventors
Witnesses
By C. A. Snow & Co.
Attorneys

UNITED STATES PATENT OFFICE.

JAMES H. FISCH AND JOSEPH C. BABST, OF BARNESVILLE, MINNESOTA.

ICE-SAWING MACHINE.

No. 929,846.  Specification of Letters Patent.  Patented Aug. 3, 1909.

Application filed March 23, 1908. Serial No. 422,712.

*To all whom it may concern:*

Be it known that we, JAMES H. FISCH and JOSEPH C. BABST, citizens of the United States, residing at Barnesville, in the county of Clay, State of Minnesota, have invented a new and useful Ice-Sawing Machine, of which the following is a specification.

This invention relates to ice cutting machines and has for its object to provide a strong, durable and thoroughly efficient machine of this character especially designed for cutting ice on a lake or other frozen body of water.

A further object of the invention is to provide an ice cutting machine including a truck having pivotally connected frames mounted thereon, one of which is provided with a gang of circular saws and the other provided with a propelling device for moving the machine over the surface of the ice as the saws revolve.

A further object is to provide means for simultaneously raising and lowering the pivoted frames, and means for supporting said frames in elevated position.

A still further object of the invention is generally to improve this class of devices so as to increase their utility, durability and efficiency.
Further objects and advantages will appear in the following description, it being understood that various changes in form, proportions and minor details of construction may be resorted to within the scope of the appended claims.

In the accompanying drawings forming a part of this specification: Figure 1 is a side elevation of an ice cutting machine constructed in accordance with our invention.
Fig. 2 is a top plan view of the same. Fig. 3 is a transverse sectional view taken on the line 3—3 of Fig. 1. Fig. 4 is a detail sectional view showing the connection between the pivoted frames. Fig. 5 is a detail perspective view showing the manner of locking the saw carrying frame in elevated or inoperative position.

Similar numerals of reference indicate corresponding parts in all of the figures of the drawings.

The improved ice cutting machine forming the subject matter of the present invention includes a sled or truck comprising spaced side members 5 connected by transverse sills 6 to which is bolted or otherwise rigidly secured a platform 7, there being suitable runners 8 secured to the lower edges of the transverse beams 6, as shown.

Mounted on the platform 7 is a gas engine or other motor 8', the driving shaft 9 of which is journaled in suitable bearings 10 on the vertical extensions of the side members 5, one end of the shaft being provided with a squared terminal for engagement with an operating crank 11 for starting the engine.

Pivotally mounted on the shaft 9 is a saw carrying frame 12 in which is journaled a shaft 13 carrying one or more circular saws 14 adapted to cut or sever the ice as the machine travels over the surface thereof. Secured to the shaft 13 is a pulley 15 which latter is connected through the medium of a belt 16 with a similar pulley 17 mounted on the engine shaft 9 so that motion may be transmitted from the engine 8' to revolve the saws.

Pivotally connected with the rear end of the saw carrying frame 12 is a frame 18 carrying one or more propelling wheels 19, the side bars of the frame 18 being pivotally mounted on a shaft 20. The shaft 20 is mounted for rotation in suitable brackets 21 secured to the extension 22 of the platform 7, there being a sprocket wheel 23 secured to the shaft 20 and connected through the medium of a sprocket chain 24 with a similar sprocket wheel 25 mounted on the operating shaft 26 between the propelling wheels 19, as shown. Extending transversely across the rear or pivoted end of the frame 12 is a cross bar 27 having spaced eyes 28 secured thereto for pivotal connection with suitable slotted plates 29 carried by the side bars of the propeller carrying frame 18 thereby to form a pivotal connection between the adjacent ends of both frames.

Journaled on the extension 22 of the platform at the rear of the engine 8' is a counter shaft 30 to which is secured a sprocket wheel 31, the latter being connected with a similar sprocket wheel 32 on the main driving shaft 9 by means of a sprocket chain 33. Secured to the counter shaft 30 in spaced relation to the sprocket wheel 31 is a pinion 34, which latter meshes with a master gear 35 carried by the shaft 20 so that when the engine is started motion will be transmitted to the propelling wheels 19 to drive the machine ahead. Secured to the side members 5 of the truck are inclined bars 36 connected by a transverse rod 37, which latter constitutes a handle and by means of which the machine may be guided over the surface of the ice, there being suitable brace rods 38 connecting the side members and bars 36, as shown.

Pivotally mounted at 39 on the free end of the platform or extension 22 is an operating lever 40 to the upper end of which is pivotally connected at 41 an actuating rod 42 having its opposite end pivotally mounted at 43 on a crank arm 44 extending laterally from a shaft 46 journaled in diagonal brace irons 45 connecting the side members 5 and runners 8. Disposed on opposite sides of the machine are bell-crank levers one arm 47 of each of which is keyed to the shaft 46, the opposite arms 48 of the bell-crank lever being pivotally connected with the frame 12. It will thus be seen that when the operating lever 40 is moved to the dotted line position shown in Fig. 1 of the drawings the saw carrying frame will be moved upwardly so as to elevate the saws 14 above the ice.

As the forward end of the saw carrying frame moves upwardly the rear end thereof will bear downwardly on the propeller carrying frame 18 and thereby elevate the wheels 19 so that the machine may be transported on the runners 8. The free end of the saw carrying frame 12 is provided with an outwardly curved or bowed yoke 50 the latter serving to reinforce and strengthen the frame and also to form a support for the saw guards or shields 51. The engine 8′ is provided with the usual gasolene tank 52 and battery box 53, which latter is connected with a sparking plug by the wires or conductors 54. The runners 8 not only serve to transport the machine to the place of cutting but also form guides for the truck after the first cut is made in the ice.

In operation the engine is started and through the medium of the belts and gears rotates the saws and propelling wheels. The lever 40 is then moved in the direction of the engine which forces the saws 14 in engagement with the ice and at the same time lowers the frame 18 carrying the propelling wheels 19. The propelling wheels and saws being actuated simultaneously by the motor, the machine will be moved over the surface of the ice during the cutting operation, as will be readily understood.

Having thus described the invention what is claimed is:

1. An ice cutting machine including a truck, pivotally united frames mounted for tilting movement on the truck and each pivoted at a point intermediate its ends, a saw carried by one of the frames, a propelling device mounted on the other frame, and means for tilting the frames, thereby to raise and lower the saw and propelling device, respectively.

2. An ice cutting machine including a truck, pivotally united frames mounted for tilting movement on the truck and each pivoted at a point intermediate its ends, a circular saw mounted on one of the frames, a propelling device carried by the other frame, a motor, means for transmitting motion from the motor to the saw and propelling device, respectively, and means for tilting said frames, thereby to simultaneously raise and lower the saw and propelling device.

3. An ice cutting machine including a truck, pivotally united frames mounted for tilting movement on the truck and each pivoted at a point intermediate its ends, a circular saw carried by one of the frames, a propelling device carried by the other frame, means for simultaneously tilting said frames, thereby to raise and lower the saw and propelling device, respectively, and means for locking the frames in elevated position.

4. An ice cutting machine including a truck, pivotally united frames mounted for tilting movement on the truck and each pivoted at a point intermediate its ends, a gang of circular saws carried by one of the frames, a propelling device carried by the other frame, a lever operatively connected with one of the frames for tilting both frames, thereby to move the saws and propelling device simultaneously to elevated position, and bell crank levers forming a pivotal connection between the truck and one of the frames.

5. An ice cutting machine including a truck, a motor mounted on the truck and provided with a driving shaft, a frame pivotally mounted on the driving shaft, a gang of circular saws mounted on said frame, an auxiliary frame pivotally connected with the truck at a point intermediate its ends and pivotally connected with the saw carrying frame, a propelling device carried by the auxiliary frame, means operatively connected with one of the frames for simultaneously moving both frames to elevated position, and means for transmitting motion from the motor to the saws and propelling device, respectively.

6. An ice cutting machine including a truck having runners and provided with a platform, one end of which is extended longitudinally beyond the runners, a motor mounted on the platform and provided with a driving shaft, a frame pivotally mounted on the driving shaft, a shaft journaled in the frame, a gang of circular saws secured to the shaft, a second shaft mounted for rotation on the extension of the platform, an auxiliary frame pivotally mounted on the second shaft and pivotally connected with the adjacent end of the saw carrying frame, a propelling device carried by the auxiliary frame, means operatively connected with one of the frames for simultaneously elevating both frames, and means for transmitting motion from the motor to the saws and propelling device, respectively.

7. An ice cutting machine including a truck, pivotally united frames mounted for tilting movement on the truck and each pivoted at a point intermediate its ends, a gang of circular saws carried by one of the frames, a propelling device carried by the other frame, an oscillating shaft mounted on the truck and provided with a crank arm, bell crank levers connecting the shaft and saw carrying frame, an operating lever pivotally mounted on the truck, and a link forming a pivotal connection between the operating lever and crank arm, said operating lever serving to tilt the frame, thereby to simultaneously raise the saws and propelling device to elevated position.

8. An ice cutting machine including a truck having a platform and provided with runners, inclined braces connecting the platform and runners, an oscillating shaft journaled in the braces and provided with a crank arm, pivotally united frames mounted for tilting movement on the truck and each pivoted at a point intermediate its ends, a gang of circular saws carried by one of the frames, a propelling device carried by the other frame, bell crank levers each having one arm thereof pivotally connected with the saw carrying frame and its opposite arm keyed to the oscillating shaft, an operating lever, and a rod forming a pivotal connection between the operating lever and crank arm.

In testimony that we claim the foregoing as our own, we have hereto affixed our signatures in the presence of two witnesses.

JAMES H. FISCH.
JOSEPH C. BABST.

Witnesses:
ANDREW N. GLASGOW,
NILS HALVORSON.